US008622056B2

(12) United States Patent
Bohl

(10) Patent No.: US 8,622,056 B2
(45) Date of Patent: Jan. 7, 2014

(54) SOLAR ENERGY POWER GENERATION SYSTEM

(75) Inventor: Gregory Bohl, Muenster, TX (US)

(73) Assignee: Solar Logic Incorporated, Muenster, TX (US)

( * ) Notice: Subject to any disclaimer, the term of this patent is extended or adjusted under 35 U.S.C. 154(b) by 421 days.

(21) Appl. No.: 12/884,166

(22) Filed: Sep. 16, 2010

(65) Prior Publication Data

US 2011/0061643 A1    Mar. 17, 2011

Related U.S. Application Data

(60) Provisional application No. 61/243,154, filed on Sep. 16, 2009.

(51) Int. Cl.
*F24J 2/38* (2006.01)

(52) U.S. Cl.
USPC .............................. 126/573; 126/694; 126/605

(58) Field of Classification Search
USPC ................. 126/573, 605, 640, 663, 694
See application file for complete search history.

(56) References Cited

U.S. PATENT DOCUMENTS

| | | | | |
|---|---|---|---|---|
| 3,822,692 A | * | 7/1974 | Demarest ..................... | 126/591 |
| 3,913,401 A | * | 10/1975 | Sweeney ..................... | 73/299 |
| 3,990,914 A | | 11/1976 | Weinstein et al. | |
| 4,000,734 A | * | 1/1977 | Matlock et al. ............... | 126/576 |
| 4,026,273 A | * | 5/1977 | Parker ........................ | 126/649 |
| 4,044,949 A | * | 8/1977 | Morawetz et al. ............ | 126/586 |
| 4,135,493 A | * | 1/1979 | Kennedy ..................... | 126/577 |
| 4,202,322 A | * | 5/1980 | Delgado et al. ............... | 126/574 |
| 4,249,083 A | * | 2/1981 | Bitterly ........................ | 290/1 R |
| 4,286,579 A | * | 9/1981 | Johnston ..................... | 126/694 |
| 4,414,960 A | * | 11/1983 | Wasserman ................... | 126/626 |
| 4,586,334 A | | 5/1986 | Nilsson, Sr. et al. | |
| 4,608,964 A | * | 9/1986 | Russo .......................... | 126/688 |
| 5,150,568 A | * | 9/1992 | White .......................... | 60/797 |
| 5,181,654 A | * | 1/1993 | Yoshimi et al. ............. | 236/91 C |
| 5,555,878 A | | 9/1996 | Sparkman | |
| 6,700,054 B2 | | 3/2004 | Cherney et al. | |
| 7,270,295 B2 | | 9/2007 | Bennett | |
| 7,325,401 B1 | * | 2/2008 | Kesseli et al. .................. | 60/677 |
| 7,343,913 B2 | | 3/2008 | Niedermeyer | |
| 7,553,035 B2 | | 6/2009 | Wright | |
| 7,975,686 B2 | | 7/2011 | Prueitt | |

(Continued)

FOREIGN PATENT DOCUMENTS

| | | |
|---|---|---|
| CN | 2442188 Y | 8/2001 |
| CN | 201091064 Y | 7/2008 |
| CN | 101354021 A | 1/2009 |

OTHER PUBLICATIONS

International Search Report and Written Opinion for Application No. PCT/US2010/049196, Dated May 30, 2011.

(Continued)

*Primary Examiner* — Thomas E. Denion
*Assistant Examiner* — Shafiq Mian
(74) *Attorney, Agent, or Firm* — Daniel J. Chalker; Chalker Flores, LLP

(57) ABSTRACT

A solar energy power generation system generates AC electrical power from solar radiation through the use of parabolic troughs to capture the energy and a fluid turbine to convert the solar energy to mechanical energy. The turbine is directly coupled to a generator to produce AC electrical power.

23 Claims, 6 Drawing Sheets

(56) References Cited

U.S. PATENT DOCUMENTS

| | | | |
|---|---|---|---|
| 2008/0128017 A1* | 6/2008 | Ford | 136/248 |
| 2008/0149172 A1* | 6/2008 | Neff et al. | 136/252 |
| 2009/0056699 A1* | 3/2009 | Mills et al. | 126/600 |
| 2009/0139512 A1 | 6/2009 | Lima | |
| 2009/0188546 A1 | 7/2009 | McGlynn et al. | |
| 2010/0205963 A1 | 8/2010 | Ammar | |
| 2010/0206296 A1 | 8/2010 | Matalon | |

OTHER PUBLICATIONS

Kalogirou, Soteris, "Recent Patents in Solar Energy Collectors and Applications," Recent Patent on Engineering, (2007), pp. 23-33.

* cited by examiner

SOLAR ENERGY POWER GENERATION SYSTEM

CROSS-REFERENCE TO RELATED APPLICATIONS

This patent application is a non-provisional application of U.S. patent application 61/243,154 filed on Sep. 16, 2009 entitled "Solar Energy Power Generation System", which is hereby incorporated by reference in its entirety. This patent application is also related to U.S. patent applications 61/361,238 filed on Jul. 2, 2010, 61/361,251 filed on Jul. 2, 2010, and 61/361,266 filed on Jul. 2, 2010, all of which are hereby incorporated by reference in their entirety.

FIELD OF THE INVENTION

The present invention relates generally to the field of power generation and, more particularly, to a solar energy power generation system.

BACKGROUND OF THE INVENTION

The high cost, diminishing supply and environmental impact of fossil fuels continues to promote interest in solar energy and other alternative clean energy sources. Solar energy has been used to heat water for use in homes and businesses for many years. Likewise, direct conversion of solar energy to electricity has been used for many years for satellites and spacecraft. But, these existing solar energy systems typically have low thermal efficiencies, require large installation areas and/or require expensive components. As a result, systems to efficiently and cost effectively convert solar energy to electricity are not available to the general public.

Accordingly, there is a need for a more efficient and economical system to generate electricity from solar energy.

SUMMARY OF THE INVENTION

The present invention provides a system for generating AC electrical power from solar radiation through the use of parabolic troughs capturing the energy and a fluid turbine to convert the solar energy to mechanical energy. The turbine is directly coupled to a generator to produce AC electrical power.

More specifically, the present invention provides a solar power system that includes one or more solar collectors, a solar tracking device, a fluid/vapor turbine, a generator and a controller. Each solar collector includes (a) one or more support structures for securely mounting the solar collector to a surface, (b) a reflective parabolic trough for concentrating solar energy along a focal axis and attached to the support structure(s) to allow rotation of the reflective parabolic trough around a longitudinal axis, (c) one or more receiver tubes attached to the reflective parabolic trough along the focal axis, and (d) a motor operably connected to the reflective parabolic trough to rotate the reflective parabolic trough around the longitudinal axis. Each receiver tube includes (i) a metal tube having an inlet, an outlet and a solar absorption coating, and (ii) a transparent tube having a first seal and a second seal to vacuum or hermetically seal the metal tube between approximately the inlet and the outlet within the transparent tube. The solar tracking device has one or more sensors to control the motor to align each solar collector to maximize the solar energy collected by the one or more receiver tubes. The fluid/vapor turbine has a drive shaft, a fluid/vapor inlet connected to the outlet of the receiver tube(s) and a fluid/vapor outlet connected to the inlet of the receiver tube(s). The generator is connected to the drive shaft of the fluid/vapor turbine and having one or more electrical output terminals. The controller is connected to the motor, the solar tracking device, the fluid/vapor turbine and the generator to monitor and control the system.

In addition, the present invention provides a solar power system that includes one or more solar collectors, a solar tracking device, a fluid/vapor turbine, a generator and a controller. Each solar collector includes (a) one or more support structures for securely mounting the solar collector to a surface, (b) a reflective parabolic trough for concentrating solar energy along a focal axis and attached to the support structure(s) to allow rotation of the reflective parabolic trough around a longitudinal axis, (c) one or more receiver tubes attached to the reflective parabolic trough along the focal axis, and (d) a motor operably connected to the reflective parabolic trough to rotate the reflective parabolic trough around the longitudinal axis. Each receiver tube includes (i) a metal tube having an inlet, an outlet and a solar absorption coating, and (ii) a transparent tube having a first seal and a second seal to vacuum or hermetically seal the metal tube between approximately the inlet and the outlet within the transparent tube. The solar tracking device has one or more sensors to control the motor to align each solar collector to maximize the solar energy collected by the one or more receiver tubes, wherein the sensors comprise three or more photosensitive diodes disposed on the reflective parabolic trough such that when the reflective parabolic through is properly aligned: at least a first of the photosensitive diodes is positioned within a center of a shadow cast by the receiver tube(s), a least a second of the photosensitive diodes is positioned within and near a first edge of the shadow cast by the receiver tube(s), and a least a third of the photosensitive diodes is positioned within and near a second edge of the shadow cast by the receiver tube(s). The fluid/vapor turbine has a drive shaft, a fluid/vapor inlet and a fluid/vapor outlet. The generator is connected to the drive shaft of the fluid/vapor turbine and having one or more electrical output terminals. A first operating pressure modulation valve and a temperature/pressure sensor are connected between the outlet of the receiver tube(s) and the fluid/vapor inlet of the fluid/vapor turbine. A back flow prevention valve is connected to the fluid/vapor outlet of the fluid/vapor turbine. A pressure vessel is connected to the back flow prevention valve. A secondary line connects the pressure vessel to a hose or pipe between the outlet of the receiver tube(s) and the first operating pressure modulation valve. A third operating pressure modulation valve is disposed in the secondary line. A primer/boost pump is connected to the pressure vessel. A second operating pressure modulation valve is connected between the primer/boost pump and the inlet of the receiver tube(s). A controller is connected to the motor, the solar tracking device, the fluid/vapor turbine and the generator to monitor and control the system.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to reflective parabolic trough solar collectors, but it will be understood that the concepts of the present invention are applicable to any type of solar collector, such as a parabolic dish.

The present invention provides a system for generating AC electrical power from solar radiation through the use of parabolic troughs capturing the energy and a fluid turbine to convert the solar energy to mechanical energy. The turbine is directly coupled to a generator to produce AC electrical power.

Figure 1:
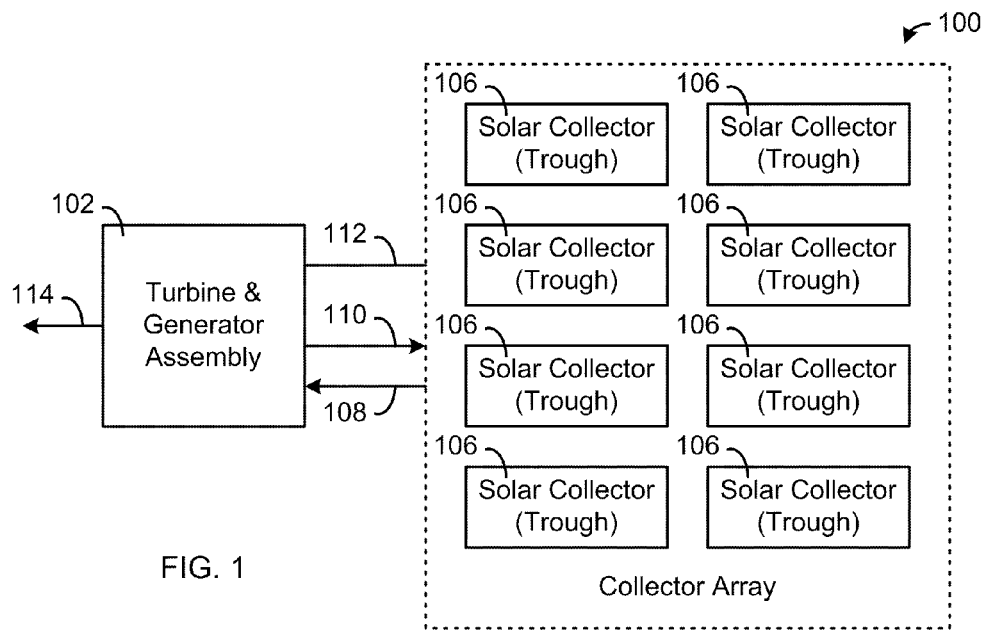
FIG. 1 is a high level block diagram of a solar energy power generation system in accordance with one embodiment of the present invention.

Now referring to FIG. 1, a high level block diagram of a solar energy power generation system 100 in accordance with one embodiment of the present invention is shown. The solar energy power generation system 100 provides an encapsulated solution in which all components and fluids are fully contained within a single compact unit. The major subsystems of the solar energy power generation system 100 are a turbine and generator assembly 102 and a solar collector array 104 that can have one or more solar collectors (troughs) 106. In one example, the turbine and generator assembly 102 weighs approximately 150 lbs and is approximately 4 ft×2 ft×2 ft, and the solar collector (trough) 106 weighs approximately 105 lbs and is approximately 4 ft×12 ft. The turbine and generator assembly 102 are connected to the one or more solar collectors (troughs) 106 with input 108 and output 110 hoses or pipes. A low power cable 112 (e.g., 5V) runs from the turbine and generator assembly 102 to the one or more solar collectors (troughs) 106). Power generated by the turbine and generator assembly 102 is provided to the home, building, business, electrical load or utility circuit via a power connection 114. Note that various meters, relays, breakers, reverse power flow sensors and other monitoring/protection devices may be installed between the generator and the home, building, business, electrical load or utility circuit. The turbine and generator assembly 102 and the solar collector (troughs) 106 will be described in more detail below. Note that the number of solar collectors (troughs) 106 shown in FIG. 1 is merely for illustration purposes and present invention is not limited to the number of solar collector shown.

Figure 2:
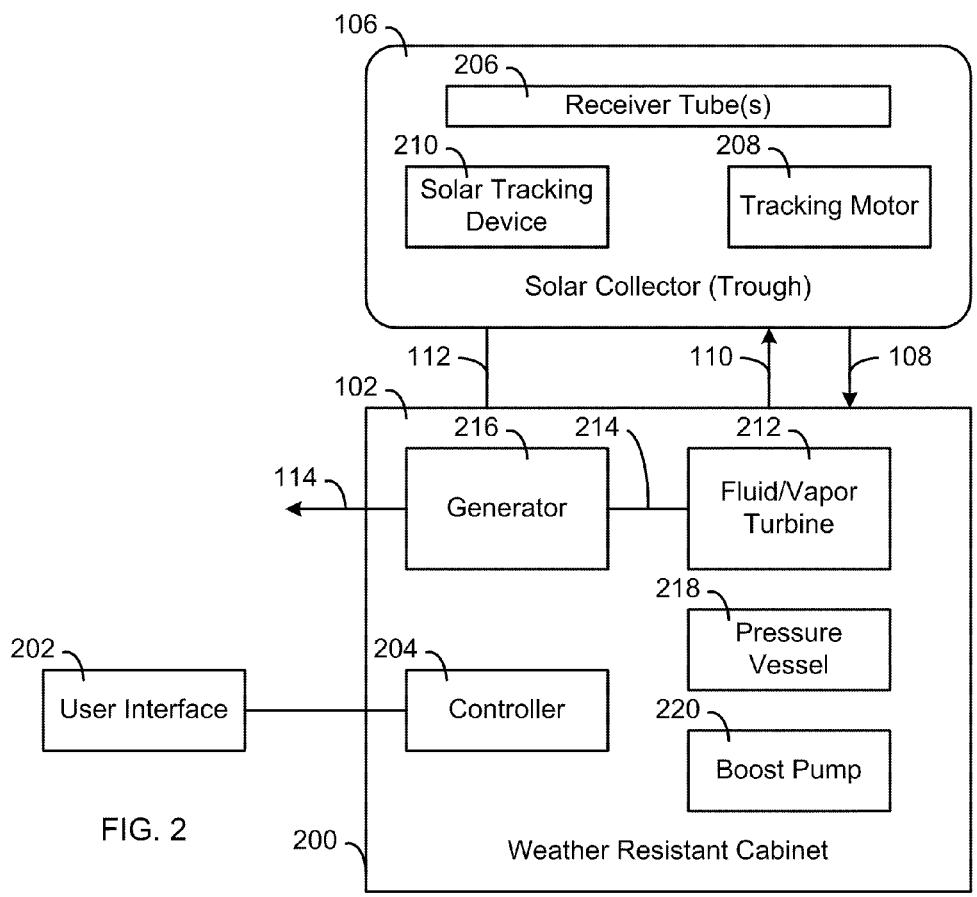
FIG. 2 is a block diagram of a turbine and generator assembly connected to solar collector (trough) in accordance with one embodiment of the present invention.

Referring now to FIG. 2, a block diagram of a turbine and generator assembly 102 connected to solar collector (trough) 106 in accordance with one embodiment of the present invention is shown. The turbine and generator assembly 102 is contained within a weather resistant cabinet 200 suitable for ground or attic installations. The solar energy power generation system 100 can be controlled and monitored by user interface 202 (software) that allows remote control and monitoring of the system. The user interface 202 is not the code running on the controller 204 (e.g., Programmable Logic Controller). Instead, user interface 202 provides allows a user to track power consumption, power production, system diagnostics and other control/monitoring functions. The user interface 202 can be installed on any user device communicably coupled to the controller. For example, the user device may include a computer, a laptop, a PDA, a phone, a mobile communications device or other electronic device. The user device having user interface 202 can be communicably coupled to the controller 204 via a direct connection, a network connection, a USB connection, a wireless network, a wide area network or a combination thereof.

The solar collector 106 includes one or more support structures for securely mounting the solar collector 106 to a surface (not shown), a reflective parabolic trough for concentrating solar energy along a focal axis, one or more receiver tubes 206 attached to the reflective parabolic trough along the focal axis, a motor 208 operably connected to the reflective parabolic trough to rotate the reflective parabolic trough around the longitudinal axis, and a solar tracking device or circuit 210. A typical installation will have eight to twenty solar collectors 106, although the exact number of solar collectors 106 will be determined by various design specifications, such as energy requirements, geographic location, physical constraints and other factors.

The weather resistant cabinet 200 provides protection and concealment of a fluid/vapor turbine 212 having a drive shaft 214, a generator 216 connected to the drive shaft 214 of the fluid/vapor turbine 212, a controller 204, a pressure vessel 218 and a primer/boost pump 220. The generator 216 and the fluid/vapor turbine 212 can be directly coupled or coupled through a transmission or gear assembly. Note that the fluid/vapor turbine 212 can be a Tesla or Sterling engine. The fluid/vapor turbine 212, pressure vessel 218 and primer/boost pump 220 are connected together and to the receiver tube(s) 206 with input 108 and output 110 hoses or pipes. A low power cable 112 (e.g., 5V) runs from the cabinet 200 to each solar collector 106 (typically in a daisy chain). Power generated by the generator 216 is provided to the home, building, business, electrical load or utility circuit via a power connection 114. Note that various meters, relays, breakers, reverse power flow sensors and other monitoring/protection devices may be installed between the generator and the home, building, business, electrical load or utility circuit. The controller 204 is connected to the motor 208, the solar tracking device 210, the fluid/vapor turbine 212 and the generator 216 to monitor and control the system. The controller 204 can be a PLC, PCB or computer.

In other words, the present invention provides a solar power system 100 that includes one or more solar collectors 106, a solar tracking device 210, a fluid/vapor turbine 212, a generator 216 and a controller 204. Each solar collector 106 includes (a) one or more support structures 404 for securely mounting the solar collector 106 to a surface, (b) a reflective parabolic trough 400 for concentrating solar energy along a focal axis and attached to the support structure(s) 404 to allow rotation of the reflective parabolic trough 400 around a longitudinal axis, (c) one or more receiver tubes 206 attached to the reflective parabolic trough 400 along the focal axis, and (d) a motor 208 operably connected to the reflective parabolic trough 400 to rotate the reflective parabolic trough 400 around the longitudinal axis. Each receiver tube 206 includes (i) a metal tube 804 having an inlet 318, an outlet 302 and a solar absorption coating, and (ii) a transparent tube 802 having a first seal and a second seal to vacuum or hermetically seal the metal tube 804 between approximately the inlet 318 and the outlet 302 within the transparent tube 802. The solar tracking device 210 has one or more sensors 500 to control the motor 208 to align each solar collector 106 to maximize the solar energy collected by the one or more receiver tubes 206. The fluid/vapor turbine 212 has a drive shaft 214, a fluid/vapor inlet 304 connected to the outlet 203 of the receiver tube(s) 206 and a fluid/vapor outlet 310 connected to the inlet of the receiver tube(s) 318. The generator 216 is connected to the drive shaft 214 of the fluid/vapor turbine 212 and has one or more electrical output terminals 114. The controller 204 is connected to the motor 208, the solar tracking device 210, the fluid/vapor turbine 212 and the generator 216 to monitor and control the system 100. The controller 204 can also position each solar collector 106 to minimize damage in potentially damaging weather via on-site sensors or remote input from the National Weather Service or other alert system.

In one embodiment, up to six solar collectors will be required for 10 kW output based on 4.45 square meters of surface per collector. For example, the specifications for a system in accordance with one embodiment of the present invention are:

| Turbine/Generator | |
|---|---|
| Output | 10 kW |
| Input Pressure | 140 PISG |
| Exhaust Pressure | 10 PSIG (Max) |
| Inlet Temperature | 361° F. |
| Outlet Temperature | 240° F. |
| Steam Usage | 1600 LB/HR |
| Inlet Pipe (OD) | One inch |
| Conversion Rates | |
| 1 BTU = | 1.06 kJ |
| 1 lb = | 0.4536 kg |
| Solar Collector Calculations | |
| Energy from Sun (clear summer day) | 1,000 W/m² |
| Parabolic Trough | 4 ft × 12 ft = 4.46 m² |
| Collector Efficiency | 0.68 |
| Power from Collector | 1000 × 4.46 × 0.68 = 3.033 kW per trough |
| Six Troughs = | 18.197 kW of energy available from the Sun |
| Steam Characteristics | |
| Total heat of steam at 240° F. = | 1160 BTU/lb |
| Total heat of steam at 361° F. = | 1194 BTU/lb |
| Change in heat/lb = | 34 BTU/lb = 36 kJ/lb = 79.36 kJ/kg |
| Required turbine steam usage: | 2700 lb/hr = 1224.7 kg/hr = 0.340 kg/sec |
| Steam provided by the collector = | 3.033 kW/79.36 kJ/kg = 0.038 kg/sec |

The controller provides a wide range of controls and functionality, such as:

Solar Panel
   Calibration
   Tracking
      One Axis
   Shutdown
      Storms
      Malfunction
Turbine Control
   RPM
      Input and Output Pressures
      Operational Speed
   Malfunction
   Shutdown
   Log/History
Transmission Control (optional depending on the turbine/generator specifications)
   Engage
   Disengage
   Malfunction
   Shutdown
   Log/History
Generator Control
   Speed
   Output
   Temperature
   Shutdown
Transfer Switch Control
   Input Current
   Output Current
   Status
   Log/History
System Management
   System Control
   Error Management
   Sub-System-Enable/Disengage
   Remote Access/Phone home
   Heartbeat Monitor
   History Other control mechanisms, sensors and functionality can be added to the system.

Figure 3:
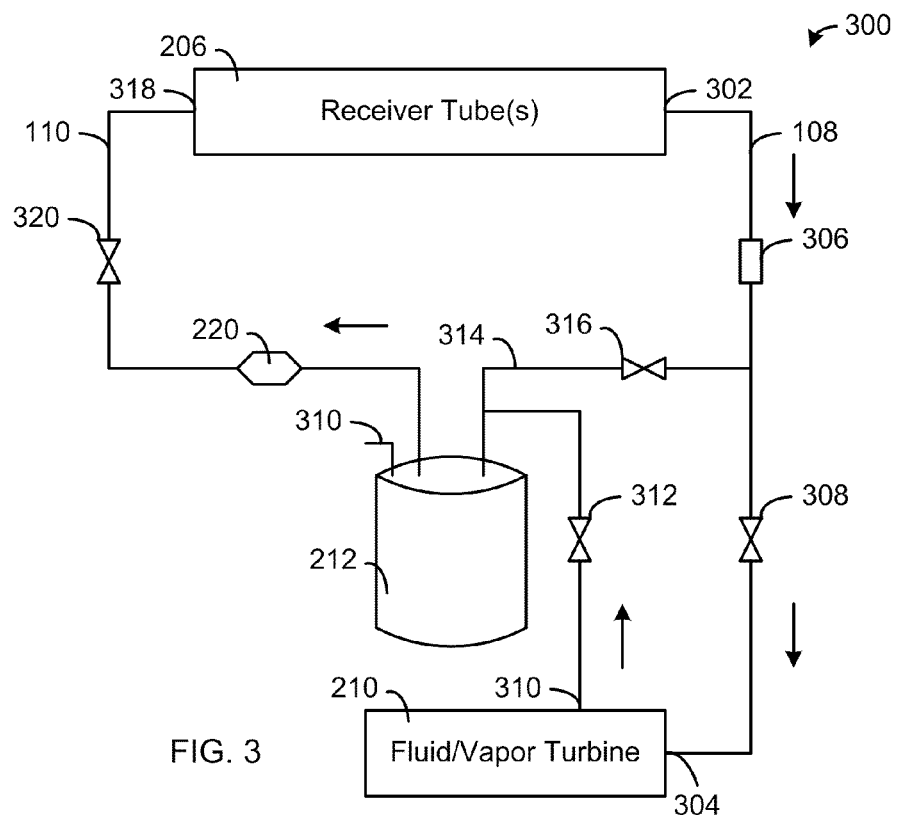
FIG. 3 is a block diagram showing the valve and piping layout for a solar energy power generation system in accordance with one embodiment of the present invention.

Now referring to FIG. 3, a block diagram showing the valve and piping layout 300 for a solar energy power generation system 100 in accordance with one embodiment of the present invention is shown. The input hose or pipe 108 connects the outlet 302 of the receiver tube(s) 206 to the fluid/vapor inlet 304 of the fluid/vapor turbine 210. A temperature and pressure probe or sensor 306 and a first operating pressure modulation valve (2 way) 308 are connected between the outlet 302 of the receiver tube(s) 206 and the fluid/vapor inlet 304 of the fluid/vapor turbine 210. The fluid/vapor outlet 310 of the fluid/vapor turbine 210 is connected to the pressure vessel 212. A back flow prevention valve 312 is connected between the fluid/vapor outlet 310 of the fluid/vapor turbine 210 and the pressure vessel 212. A secondary line 314 connects the pressure vessel 212 to the input hose or pipe 108 between the temperature and pressure probe or sensor 306 and the first operating pressure modulation valve (2 way) 308. A third operating pressure modulation valve (2 way) 316 on the secondary line 314 is located between the pressure vessel 212 and the input hose or pipe 108. The output hose or pipe 110 connects the inlet 318 of the receiver tube(s) 206 to the boost pump 220 which is connected to pressure vessel 212. A second operating pressure modulation valve 320 is connected between the inlet 318 of the receiver tube(s) 206 and the boost pump 220 to control flow into the system and stop the flow in an emergency (Emergency Shutdown). Arrows show the flow of the fluid/vapor. The pressure vessel 212 has a pressure relief valve 310 and may also have other sensors/probes, such as temperature, pressure, fluid level, etc. Temperature and/or pressure sensors/probes can be installed at various monitoring points throughout the system 100, such as near the receiver tubes 206, the fluid/vapor turbine 210, the pressure vessel 212, etc. The temperature and pressure probe/sensors (e.g., 306) are communicably coupled to the controller 204. A RPM sensor (not shown) is attached to the drive shaft 214 and communicably coupled to the controller 204. In one embodiment, the system 300 operates at approximately 140 PSI.

Figure 4:
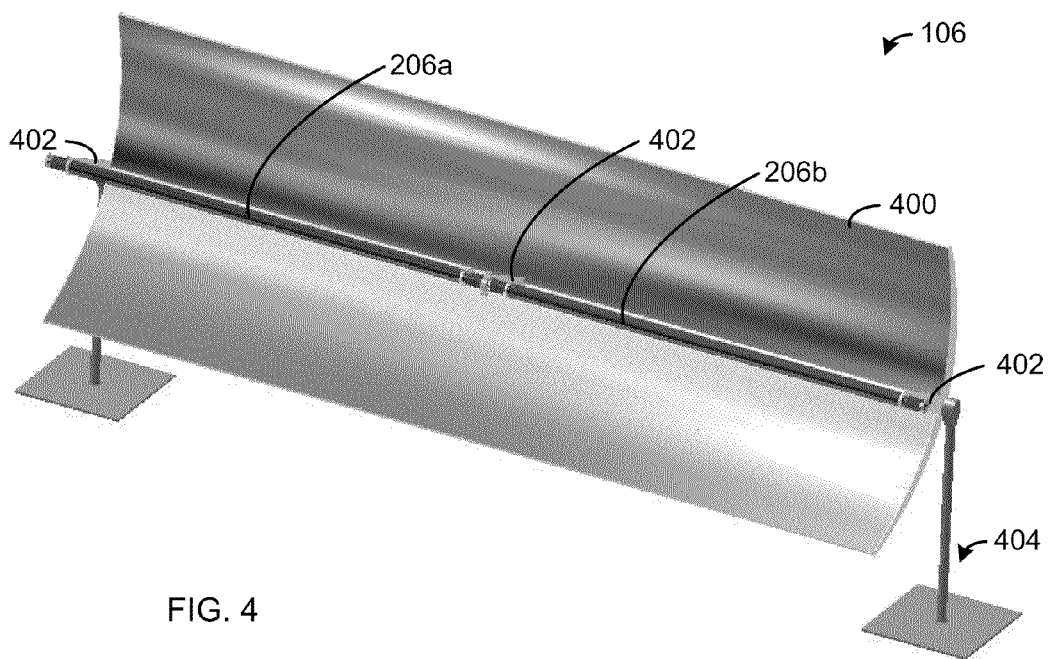
FIG. 4 is a diagram of a reflective parabolic trough in accordance with one embodiment of the present invention.

Referring now to FIG. 4, a diagram of a solar collector 106 in accordance with one embodiment of the present invention is shown. In this embodiment of the present invention, the reflective parabolic trough 400 is made of aluminum or an aluminum alloy and has an aperture of approximately four feet, a length of approximately 12 feet (not including mounting pylons), a rim angle to approximately 82.5 degrees, a focal length of approximately 1.14 feet and a surface area facing the focal axis of 62.8 square feet. The solar collector 106 is roof mountable and weights approximately 105 pounds. The solar collector 106 includes adjustable brackets 402 and support pylons 404 (see FIG. 9). Each solar collector 106 has two receiver tubes 206a and 206b that are approximately six feet long (each). They are mounted to the collector with three adjustable mounting brackets 402. The brackets 402 allow for three axis of alignment for the receiver tubes 206a and 206b. The surface of the reflective parabolic trough 400 facing the focal axis is coated with a reflective material.

For example, the curve dimensions of a parabolic reflector 400 in accordance with one embodiment of the present invention can be:

| Y (ft) | X (ft) | Y (in) | X (in) | Focal Point (ft) |
|---|---|---|---|---|
| 0.877 | 2.000 | 10.526 | 24 | 1.14 |
| 0.806 | 1.917 | 9.667 | 23 | 1.14 |
| 0.737 | 1.833 | 8.845 | 22 | 1.14 |
| 0.672 | 1.750 | 8.059 | 21 | 1.14 |
| 0.609 | 1.667 | 7.310 | 20 | 1.14 |
| 0.550 | 1.583 | 6.597 | 19 | 1.14 |
| 0.493 | 1.500 | 5.921 | 18 | 1.14 |
| 0.440 | 1.420 | 5.281 | 17 | 1.14 |
| 0.390 | 1.330 | 4.678 | 16 | 1.14 |
| 0.343 | 1.250 | 4.112 | 15 | 1.14 |
| 0.298 | 1.167 | 3.582 | 14 | 1.14 |
| 0.257 | 1.083 | 3.088 | 13 | 1.14 |
| 0.219 | 1.000 | 2.632 | 12 | 1.14 |
| 0.184 | 0.917 | 2.211 | 11 | 1.14 |
| 0.152 | 0.833 | 1.827 | 10 | 1.14 |
| 0.123 | 0.750 | 1.480 | 9 | 1.14 |
| 0.097 | 0.667 | 1.170 | 8 | 1.14 |
| 0.075 | 0.583 | 0.895 | 7 | 1.14 |
| 0.055 | 0.500 | 0.658 | 6 | 1.14 |
| 0.038 | 0.417 | 0.457 | 5 | 1.14 |
| 0.024 | 0.333 | 0.292 | 4 | 1.14 |
| 0.014 | 0.250 | 0.164 | 3 | 1.14 |
| 0.006 | 0.167 | 0.073 | 2 | 1.14 |
| 0.002 | 0.083 | 0.018 | 1 | 1.14 |
| 0.000 | 0.000 | 0.000 | 0 | 1.14 |
| 0.002 | −0.083 | 0.018 | −1 | 1.14 |
| 0.006 | −0.167 | 0.073 | −2 | 1.14 |
| 0.014 | −0.250 | 0.164 | −3 | 1.14 |
| 0.024 | −0.333 | 0.282 | −4 | 1.14 |
| 0.038 | −0.417 | 0.457 | −5 | 1.14 |
| 0.055 | −0.500 | 0.658 | −6 | 1.14 |
| 0.075 | −0.583 | 0.895 | −7 | 1.14 |
| 0.097 | −0.667 | 1.170 | −8 | 1.14 |
| 0.123 | −0.750 | 1.480 | −9 | 1.14 |
| 0.152 | −0.833 | 1.827 | −10 | 1.14 |
| 0.184 | −0.917 | 2.211 | −11 | 1.14 |
| 0.219 | −1.000 | 2.632 | −12 | 1.14 |
| 0.257 | −1.083 | 3.088 | −13 | 1.14 |
| 0.298 | −1.167 | 3.582 | −14 | 1.14 |
| 0.343 | −1.250 | 4.112 | −15 | 1.14 |
| 0.390 | −1.330 | 4.678 | −16 | 1.14 |
| 0.440 | −1.420 | 5.281 | −17 | 1.14 |
| 0.493 | −1.500 | 5.921 | −18 | 1.14 |
| 0.550 | −1.583 | 6.597 | −19 | 1.14 |
| 0.609 | −1.667 | 7.310 | −20 | 1.14 |
| 0.672 | −1.750 | 8.059 | −21 | 1.14 |
| 0.737 | −1.833 | 8.845 | −22 | 1.14 |
| 0.806 | −1.917 | 9.667 | −23 | 1.14 |
| 0.877 | −2.000 | 10.526 | −24 | 1.14 |

Figure 5A:
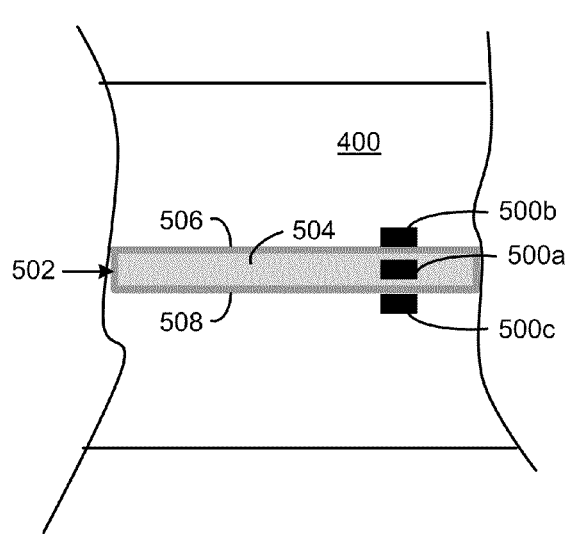
FIGS. 5A and 5B are diagrams of a solar tracking device mounted on a reflective parabolic trough in accordance with one embodiment of the present invention.
Figure 5B:
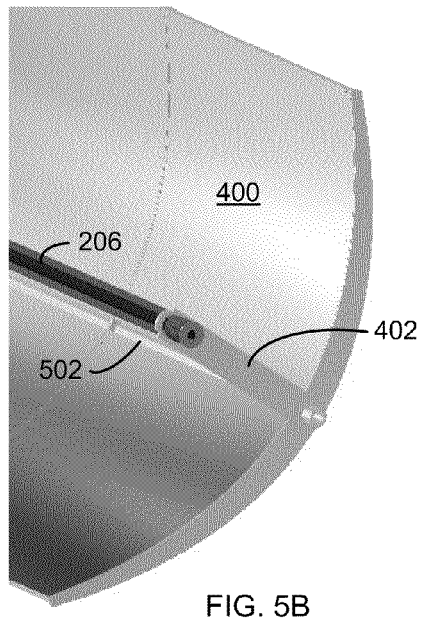

Now referring to FIGS. 5A and 5B, diagrams of a solar tracking device or circuit 210 mounted on the reflective parabolic trough 400 in accordance with one embodiment of the present invention are shown. The solar tracking device or circuit 210 includes one or more sensors. In this embodiment, the one or more sensors include three or more photosensitive diodes 500 disposed on the reflective parabolic trough 400 such that when the reflective parabolic through 400 is properly aligned: (a) at least a first of the photosensitive diodes 500a is positioned within a center 504 of a shadow 502 cast by the receiver tube(s) 206, (b) a least a second of the photosensitive diodes 500b is positioned within and near a first edge 506 of the shadow 502 cast by the receiver tube(s) 206, and (c) a least a third of the photosensitive diodes 500c is positioned within and near a second edge 508 of the shadow 502 cast by the receiver tube(s) 206. The solar tracking device 210 can position the solar collector 106 at a previously recorded time-based position whenever the one or more sensors 500 do not provide a position to maximize the solar energy collected by the receiver tube(s) 206.

The solar tracking device or circuit 210 measures the difference in light intensity measured by the photosensitive diodes 500 and if the diodes in sunlight (e.g., 500b or 500c) move to the shadow 502, the tracking motor 209 (e.g., stepper motor) adjusts the position of the reflective parabolic trough 400 to move the diodes (e.g., 500b or 500c) back into sunlight. If this cannot be achieved within a pre-defined number of steps, the solar tracking device or circuit 210 will position the reflective parabolic trough 400 to a prior days position for the given time slot. As a result, the solar tracking device 210 aligns each solar collector 106 to be in the correct position to maximize the solar energy collected by the receiver tube(s) 206 regardless of weather conditions.

Figure 6:
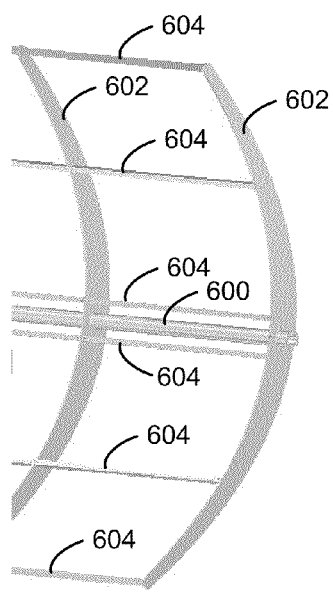
FIG. 6 is a diagram of some structural details of a reflective parabolic trough in accordance with one embodiment of the present invention.

Referring now to FIG. 6, a diagram of some structural details of a reflective parabolic trough 400 in accordance with one embodiment of the present invention is shown. The structural details of the reflective parabolic trough 400 includes a central support tube 600, three or more support ribs 602 attached to the central support tube 600 to provide a parabolic shape, a support stringer 604 attached between the support ribs 602 at or near an end of the support ribs 602, and a metallic sheet (not shown) attached to the support ribs 604 to form the parabolic shape. As shown, the trough is constructed with five support ribs 602 spaced 36 inches apart, six support stringers 604, and a central support tube 600 on which the reflective parabolic trough 400 rotates. The frame is covered with a 20 gauge aluminum skin which the reflective material is bonded to.

Figure 7:
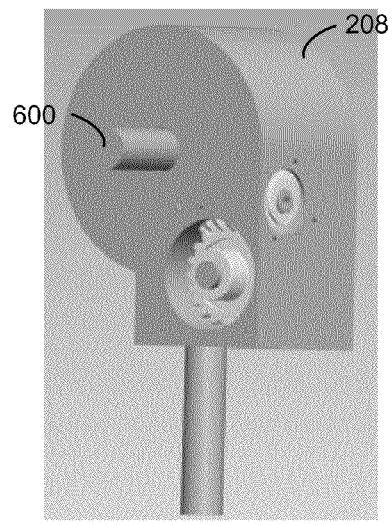
FIG. 7 is a diagram of a motor assembly for rotating a reflective parabolic trough in accordance with one embodiment of the present invention.

Now referring to FIG. 7, a diagram of a tracking motor assembly 208 for rotating a reflective parabolic trough 400 in accordance with one embodiment of the present invention is shown. As shown in this embodiment of the present invention, the reflective parabolic trough 400 rotation is controlled by a gear box assembly driven by an electric stepper motor. The gear box and electric stepper motor are mounted to one of the pylons 404.

Figure 8A:
FIGS. 8A and 8B are diagrams of a receiver tube in accordance with one embodiment of the present invention.
Figure 8B:

Referring now to FIGS. 8A and 8B, diagrams of a receiver tube 206 in accordance with one embodiment of the present invention are shown. The receiver tube 206 is an evacuated tube approximately six feet in length with a clamp and gasket style connector 800 extending from each end. The flanged and grooved end facilitates an O-ring and clamp. A threaded connector can also be used. The receiver tube 206 has an exterior layer (transparent tube) 802 that is constructed from borosilicate glass having an outer diameter of approximately 2.3 inches. The inner pipe 804 is a ¾ inch metal pipe (aluminum or an aluminum alloy metal tube) coated with a solar absorption coating applied to the exterior surface of the entire pipe. The inner pipe 804 may or may not have one or more copper heat fins soldered to it. The receiver tube 206 is sealed to the fluid pipe 804 in a manner which allows a vacuum to be applied to the interior space between the exterior layer 802 and the inner pipe 804 thereby creating an evacuated tube. In one embodiment, each end has a ¾ inch NPT threaded end approximately ¾ inch past the formed hex nut. The hex nut is formed or welded to the inner pipe 804.

Figure 9:
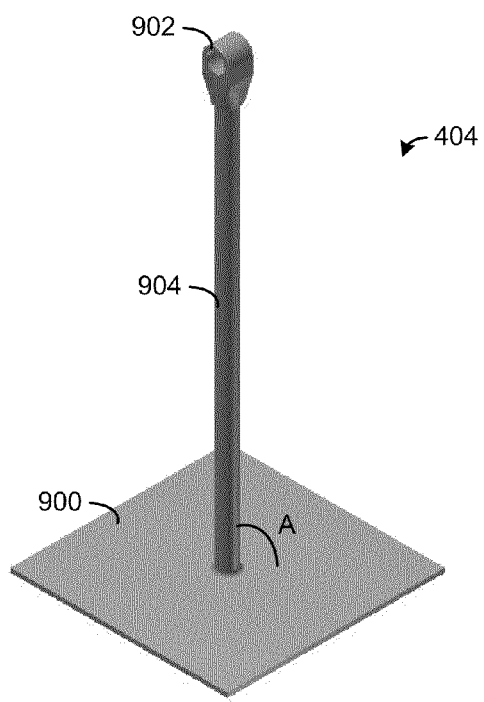
FIG. 9 is a diagram of a support structure in accordance with one embodiment of the present invention.

Now referring to FIG. 9, a diagram of a support structure 404 in accordance with one embodiment of the present invention is shown. Each support structure 404 includes a base plate 900 used to secure the solar collector 106 to the surface, a mounting block 902 for connection to the reflective parabolic trough 400, and a support 904 disposed between the base plate 900 and the mounting block 902. Note that an angle between the base plate 900 and the surface is adjustable. As shown, each mounting pylon consists of two major parts: (a) Base Plate 900; and (b) Mounting pole 904. The two components (900 and 904) are held together with a common bolt (not shown). With respect to the trough mounting block 902, the hole in the center supports the central support tube 600 and is lined with a Teflon strip which acts as a bearing surface. The central tube 904 is a 1.5 inch round tube approximately 24-26 inches long with bolt holes as the connection point of the two parts. The base plate 900 is used to fasten the collector to the roof or ground. The angle of the plate 900 to the connector (angle "A") is determined by the pitch of the roof or the slope of the ground.

Figure 10A:
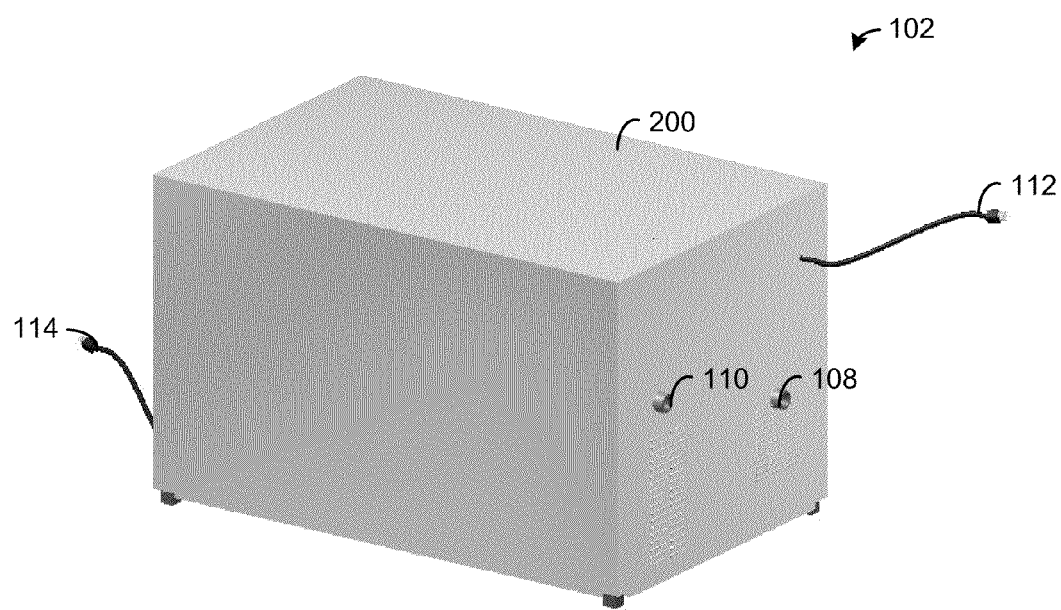
FIGS. 10A-10C are various diagrams of a housing for some of the components in accordance with one embodiment of the present invention.
Figure 10B:
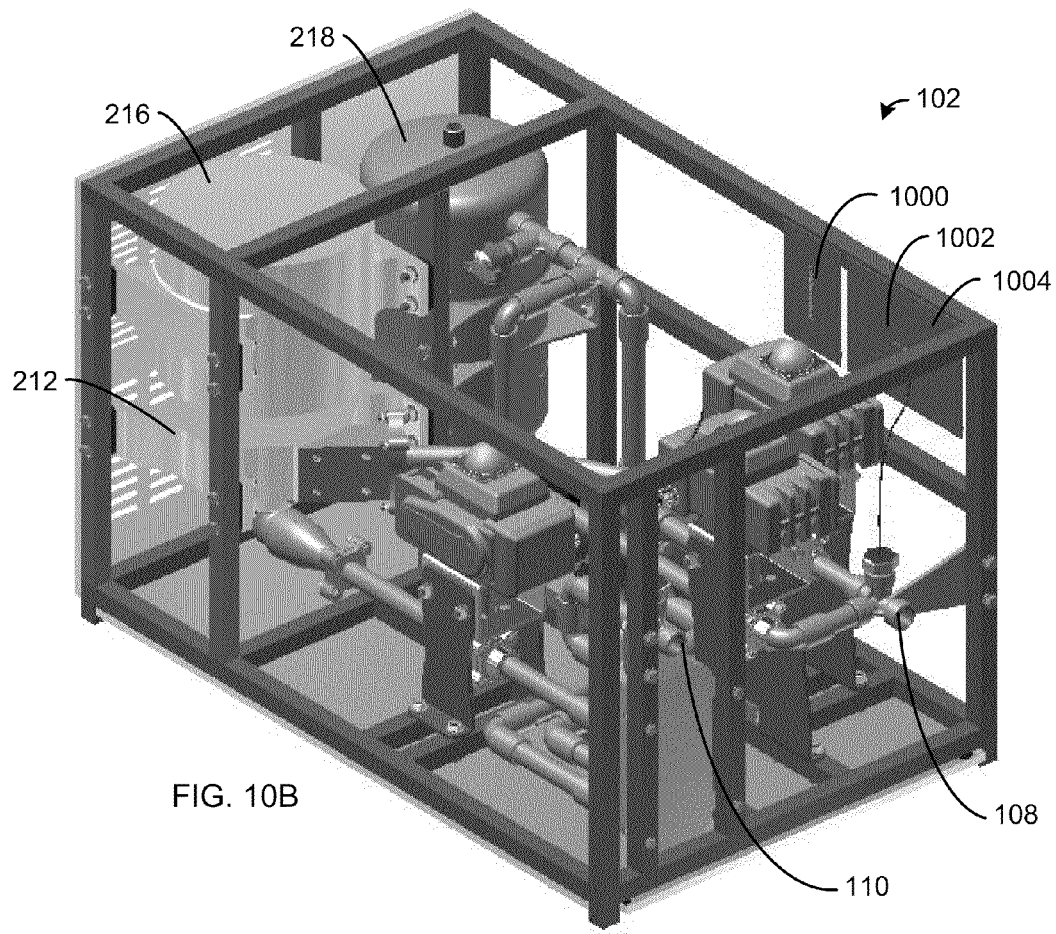
Figure 10C:
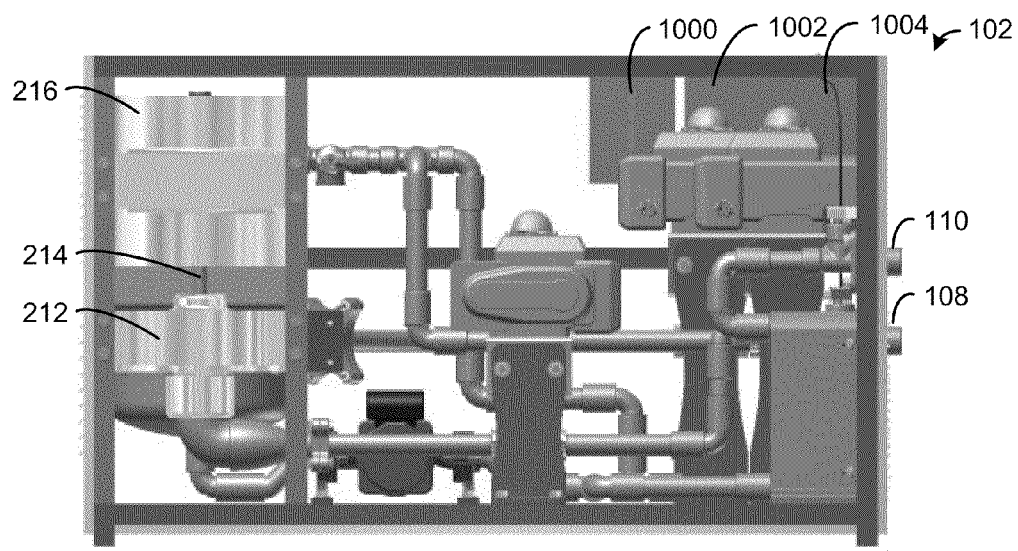

Referring now to FIGS. 10A-10C, various diagrams of the housing or cabinet 200 for some of the components are shown in accordance with one embodiment of the present invention. FIG. 10A shows an example of the housing or cabinet 200 for the turbine and generator assembly 102 that is weatherproof and suitable for outdoor or attic installation. The housing or cabinet 200 includes the input 108 and output 110 hoses or pipes, the low power cable 112 that goes to the solar collectors 106, and the power connection 144 that provides the power generated by the generator 216 to the home, building, business, electrical load or utility circuit. The power connection 114 may also include a connection to the user interface 202.

FIGS. 10B and 10C show a 3D perspective view and a side view, respectively, of the turbine and generator assembly 102 in accordance with one embodiment of the present invention. The major components are shown, such as the fluid/vapor turbine 212, generator 216, pressure vessel 218, inlet 108 and outlet 110, along with the internal bracing, piping, valves, heat exchangers, pumps, and other items. Various circuit boards (collectively the controller 204) are also shown, such as sun tracker board 1000, system control board 1002 and motor control board 1004.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A solar power system comprising:
one or more solar collectors, each solar collector comprising (a) one or more support structures for securely mounting the solar collector to a surface, (b) a reflective parabolic trough for concentrating solar energy along a focal axis and attached to the support structure(s) to allow rotation of the reflective parabolic trough around a longitudinal axis, (c) one or more receiver tubes attached to the reflective parabolic trough along the focal axis, wherein each receiver tube comprises (i) a metal tube having an inlet, an outlet and a solar absorption coating, and (ii) a transparent tube having a first seal and a second seal proximate to the inlet and the outlet of the metal tube to maintain a vacuum or hermetically seal the metal tube within the transparent tube, and (d) a motor operably connected to the reflective parabolic trough to rotate the reflective parabolic trough around the longitudinal axis;
a solar tracking device having one or more sensors to control the motor to align each solar collector to maximize the solar energy collected by the one or more receiver tubes, wherein the one or more sensors comprise three or more photosensitive diodes disposed on the reflective parabolic trough such that when the reflective parabolic trough is properly aligned: at least a first of the photosensitive diodes is positioned within a center of a shadow cast by the receiver tube(s), at least a second of the photosensitive diodes is positioned within and near a first edge of the shadow cast by the receiver tube(s), and at least a third of the photosensitive diodes is positioned within and near a second edge of the shadow cast by the receiver tube(s);
a fluid/vapor turbine having a drive shaft, a fluid/vapor inlet connected to the outlet of the receiver tube(s) and a fluid/vapor outlet connected to the inlet of the receiver tube(s);

a generator connected to the drive shaft of the fluid/vapor turbine and having one or more electrical output terminals; and a controller connected to the motor, the solar tracking device, the fluid/vapor turbine and the generator to monitor and control the system.

2. The solar power system as recited in claim 1, wherein the reflective parabolic trough further comprises a reflective coating on a surface facing the focal axis.

3. The solar power system as recited in claim 1, wherein:
the reflective parabolic trough is made of aluminum or an aluminum alloy; and
the reflective parabolic trough has an aperture of approximately four feet, a length of approximately 12 feet, a rim angle to approximately 82.5 degrees, a focal length of approximately 1.14 feet and a surface area facing the focal axis of 62.8 square feet.

4. The solar power system as recited in claim 1, wherein two receiver tubes are attached together on each solar collector.

5. The solar power system as recited in claim 1, wherein:
the metal tube is made of aluminum or an aluminum alloy;
the solar absorption coating is applied to the entire surface of the metal tube; and
the transparent tube comprises a borosilicate glass.

6. The solar power system as recited in claim 1, further comprising one or more metallic fins having the solar absorption coating attached to the metal tube.

7. The solar power system as recited in claim 1, wherein the solar tracking device will position the solar collector at a previously recorded time-based position whenever the one or more sensors do not provide a position to maximize the solar energy collected by the receiver tube(s).

8. The solar power system as recited in claim 1, wherein the solar tracking device aligns each solar collector to maximize the solar energy collected by the receiver tube(s) regardless of weather conditions.

9. The solar power system as recited in claim 1, wherein the controller positions each solar collector to minimize damage in potentially damaging weather.

10. The solar power system as recited in claim 1, wherein the fluid/vapor turbine comprises a Tesla or Sterling engine.

11. The solar power system as recited in claim 1, wherein the fluid/vapor turbine, the generator and the controller are enclosed in a weatherproof housing suitable for outdoor or attic installation.

12. The solar power system as recited in claim 1, further comprising a user interface installed on a user device communicably coupled to the controller, wherein: the user device comprises a computer, a laptop, a personal data assistant (PDA), a phone, a mobile communications device or other electronic device; and the user device is communicably coupled to the controller via a direct connection, a network connection, a USB connection, a wireless network, a wide area network or a combination thereof.

13. The solar power system as recited in claim 1, further comprising:
a pressure vessel connected between the inlet of the receiver tube(s) and the fluid/vapor outlet of the fluid/vapor turbine;
a first operating pressure modulation valve and a temperature/pressure sensor connected between the outlet of the receiver tube(s) and the fluid/vapor inlet of the fluid/vapor turbine; and
a second operating pressure modulation valve connected between the pressure vessel and the inlet of the receiver tube(s).

14. The solar power system as recited in claim 13, further comprising a primer/boost pump connected between the pressure vessel and the second operating pressure modulation valve.

15. The solar power system as recited in claim 13, further comprising:
a secondary line connecting the pressure vessel to a hose or pipe between the outlet of the receiver tube(s) and the first operating pressure modulation valve;
a third operating pressure modulation valve disposed in the secondary line; and
a back flow prevention valve connected between the fluid/vapor outlet of the fluid/vapor turbine and the pressure vessel.

16. The solar power system as recited in claim 13, further comprising:
a pressure relief valve attached to the pressure vessel;
a fluid level sensor attached to the pressure vessel and communicably coupled to the controller;
one or more additional temperature sensor and/or pressure sensors attached at various points in the system;
one or more heat exchangers attached within the system; and
a RPM sensor attached to the drive shaft and communicably coupled to the controller.

17. The solar power system as recited in claim 1, wherein the reflective parabolic trough comprises:
a central support tube;
three or more support ribs attached to the central support tube to provide a parabolic shape;
a support stringer attached between the support ribs at or near each end of the support ribs; and
a metallic sheet attached to the support ribs to form the parabolic shape.

18. The solar power system as recited in claim 1, wherein each support structure comprises:
a base plate used to secure the solar collector to the surface;
a mounting block for connection to the reflective parabolic trough; and
a support disposed between the base plate and the mounting block.

19. The solar power system as recited in claim 18, wherein an angle between the base plate and the surface is adjustable.

20. A solar power system comprising:
one or more solar collectors, each solar collector comprising (a) one or more support structures for securely mounting the solar collector to a surface, (b) a reflective parabolic trough for concentrating solar energy along a focal axis and attached to the support structure(s) to allow rotation of the reflective parabolic trough around a longitudinal axis, (c) one or more receiver tubes attached to the reflective parabolic trough along the focal axis, wherein each receiver tube comprises (i) a metal tube having an inlet, an outlet and a solar absorption coating, and (ii) a transparent tube having a first seal and a second seal proximate to the inlet and the outlet of the metal tube to maintain a vacuum or hermetically seal the metal tube within the transparent tube, and (d) a motor operably connected to the reflective parabolic trough to rotate the reflective parabolic trough around the longitudinal axis;
a solar tracking device having one or more sensors to control the motor to align each solar collector to maximize the solar energy collected by the one or more receiver tubes, wherein the sensors comprise three or more photosensitive diodes disposed on the reflective parabolic trough such that when the reflective parabolic trough is properly aligned: at least a first of the photosensitive diodes is positioned within a center of a shadow cast by the receiver tube(s), at least a second of the photosensitive diodes is positioned within and near a first edge of the shadow cast by the receiver tube(s), and at least a third of the photosensitive diodes is positioned within and near a second edge of the shadow cast by the receiver tube(s);

a fluid/vapor turbine having a drive shaft, a fluid/vapor inlet and a fluid/vapor outlet;

a generator connected to the drive shaft of the fluid/vapor turbine and having one or more electrical output terminals;

a first operating pressure modulation valve and a temperature/pressure sensor connected between the outlet of the receiver tube(s) and the fluid/vapor inlet of the fluid/vapor turbine;

a back flow prevention valve connected to the fluid/vapor outlet of the fluid/vapor turbine;

a pressure vessel connected to the back flow prevention valve;

a secondary line connecting the pressure vessel to a hose or pipe between the outlet of the receiver tube(s) and the first operating pressure modulation valve;

a third operating pressure modulation valve disposed in the secondary line;

a primer/boost pump connected to the pressure vessel a second operating pressure modulation valve connected between the primer/boost pump and the inlet of the receiver tube(s); and a controller connected to the motor, the solar tracking device, the fluid/vapor turbine and the generator to monitor and control the system.

21. The solar power system as recited in claim 20, wherein the solar tracking device will position the solar collector at a previously recorded time-based position whenever the one or more sensors do not provide a position to maximize the solar energy collected by the receiver tube(s).

22. The solar power system as recited in claim 20, wherein:

the solar tracking device aligns each solar collector to maximize the solar energy collected by the receiver tube(s) regardless of weather conditions; and the controller positions each solar collector to minimize damage in potentially damaging weather.

23. The solar power system as recited in claim 20, wherein the fluid/vapor turbine comprises a Tesla or Sterling engine.

* * * * *